US010732697B2

(12) United States Patent
Srinivas et al.

(10) Patent No.: US 10,732,697 B2
(45) Date of Patent: Aug. 4, 2020

(54) VOLTAGE RAIL COUPLING SEQUENCING BASED ON UPSTREAM VOLTAGE RAIL COUPLING STATUS

(71) Applicant: QUALCOMM Incorporated, San Diego, CA (US)

(72) Inventors: Raghavendra Srinivas, Bangalore (IN); Abhijit Joshi, Bangalore (IN); Bharat Kavala, Visakhapatnam (IN); Abinash Roy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 15/978,902

(22) Filed: May 14, 2018

(65) Prior Publication Data

US 2019/0346908 A1    Nov. 14, 2019

(51) Int. Cl.
| | |
|---|---|
| *G06F 1/3234* | (2019.01) |
| *G06F 1/3287* | (2019.01) |
| *G06F 1/30* | (2006.01) |
| *G06F 1/26* | (2006.01) |

(Continued)

(52) U.S. Cl.
CPC ............ *G06F 1/3234* (2013.01); *G06F 1/189* (2013.01); *G06F 1/26* (2013.01); *G06F 1/28* (2013.01); *G06F 1/30* (2013.01); *G06F 1/3243* (2013.01); *G06F 1/3275* (2013.01); *G06F 1/3287* (2013.01)

(58) Field of Classification Search
CPC ........ G06F 1/32; G06F 1/3206; G06F 1/3234; G06F 1/324; G06F 1/3243; G06F 1/325; G06F 1/3275; G06F 1/3287; G06F 1/3296; G06F 1/26; G06F 1/28; G06F 1/189; G06F 1/30

See application file for complete search history.

(56) References Cited

U.S. PATENT DOCUMENTS

| | | | |
|---|---|---|---|
| 8,362,805 B2 * | 1/2013 | Suzuki | H03K 19/0016 326/21 |
| 9,529,533 B1 * | 12/2016 | Dreesen | G06F 1/3296 |
| 9,582,068 B2 | 2/2017 | Tiwari et al. | |

(Continued)

OTHER PUBLICATIONS

International Search Report and Written Opinion—PCT/US2019/030442—ISA/EPO—dated Aug. 2, 2019.

*Primary Examiner* — Thomas J. Cleary
(74) *Attorney, Agent, or Firm* — Qualcomm Incorporated

(57) ABSTRACT

Various aspects are described herein. In some aspects, the disclosure provides techniques for reducing latency in switching computing cores of a computing system between operating modes. Certain aspects provide a computing device including a plurality of computing cores, each configured to operate in any one of a plurality of operating modes. The computing device further includes a first voltage rail and a plurality of components, each associated with one of the computing cores. The computing device further includes a plurality of switches, each switch configured to selectively couple a corresponding one of the plurality of components to the first voltage rail. The computing device further includes a controller configured to determine a current operating mode of each of the plurality of computing cores and switch the plurality of switches at a first selected switching rate based on the determined current operating mode of each of the plurality of computing cores.

30 Claims, 5 Drawing Sheets

(51) Int. Cl.
  *G06F 1/28*   (2006.01)
  *G06F 1/18*   (2006.01)

(56) References Cited

U.S. PATENT DOCUMENTS

| | | |
|---|---|---|
| 9,823,719 B2 | 11/2017 | Jahagirdar et al. |
| 10,122,209 B1* | 11/2018 | Salama ............... H02J 13/0075 |
| 10,459,510 B1* | 10/2019 | Srinivas ............. H03K 19/0016 |
| 2011/0198942 A1* | 8/2011 | Takayanagi ........ H03K 19/0016 307/116 |
| 2011/0205680 A1* | 8/2011 | Kidd ........................ G06F 1/26 361/93.2 |
| 2013/0111254 A1 | 5/2013 | Takayanagi et al. |
| 2014/0300407 A1* | 10/2014 | Takayanagi ...... H03K 19/00361 327/400 |
| 2016/0241240 A1 | 8/2016 | Suzuki et al. |
| 2016/0342185 A1 | 11/2016 | Rodriguez et al. |
| 2016/0363985 A1* | 12/2016 | Ehmann ................ G06F 1/3287 |
| 2017/0133931 A1 | 5/2017 | Elsayed et al. |
| 2018/0004276 A1 | 1/2018 | Wong et al. |
| 2018/0095510 A1* | 4/2018 | Tsao ...................... G06F 1/3287 |
| 2018/0253129 A1* | 9/2018 | Singh ...................... G11C 5/148 |
| 2019/0265778 A1* | 8/2019 | Srinivas .................... G11C 5/14 |
| 2020/0019229 A1* | 1/2020 | Srinivas ................ G06F 1/3287 |

\* cited by examiner

VOLTAGE RAIL COUPLING SEQUENCING BASED ON UPSTREAM VOLTAGE RAIL COUPLING STATUS

TECHNICAL FIELD

The teachings of the present disclosure relate generally to power management for computing systems, and in certain aspects, to reducing latency in switching computing cores of a computing system between operating modes.

INTRODUCTION

Computing devices, such as a computing device implementing a system-on-chip (SoC) architecture, may include multiple subsystems. For example, a SoC generally includes one or more central processing unit (CPU) subsystems (CPUSS), graphics processing unit (GPU) subsystems (GPUSS), digital signal processor (DSP) subsystems (DSPSS), etc. Each subsystem may include multiple computing cores and volatile memory (e.g., registers, cache, such as L1, L2, L3 cache, etc.) associated with the multiple computing cores. For example, a CPUSS may include multiple CPU cores embedded in an integrated circuit or chip and coupled to a local bus. The CPU cores may further be arranged into one or more computing clusters, each cluster comprising one or more cores.

In certain cases, separate clusters (e.g., in the same and/or different subsystems) are powered by separate voltage rails, meaning that the cores of different clusters can operate at different voltages. The voltage supplied to a computing core on its voltage rail associated with its cluster is referred to as VDD_APC (e.g., voltage for the application processor core). In addition to powering the cores of a cluster, the voltage rail carrying VDD_APC is used to power peripheral components associated with the cluster, such as multiple memory peripheral components that are configured to control read/write to volatile memory. Further, volatile memory across the computing device (e.g., across clusters and subsystems) may be powered by a shared voltage rail, meaning all the volatile memory in the computing device (e.g., across clusters and subsystems) operates at the same voltage. The voltage supplied to the memory on its voltage rail is referred to as VDD_MX (e.g., voltage for the memory).

In certain aspects, cores of a cluster of a subsystem may be configured to individually run in different operating modes including a low power mode (e.g., a power collapse mode or retention mode) or an active mode (e.g., a turbo mode or a nominal mode).

In some computing devices, memory associated with a core may also be powered down (e.g., put in retention mode/power collapse mode) based on the operating mode of the associated computing core. For example, if a memory is associated only with a given computing core and that computing core is put in a low power mode, the memory may also be placed in the low power mode. If a memory is shared between computing cores, and one or more of the computing cores associated with the memory is put in a low power mode, a portion of the memory (e.g., proportional to the number of computing cores associated with the memory put into the low power mode) may correspondingly be put in the low power mode as well.

In certain aspects, multiple switches (also referred to as "power switches") are used to selectively couple cores and/or peripheral components associated with the cores of a cluster to the voltage rail carrying VDD_APC. In particular, each core and/or each peripheral component may be selectively coupled to the voltage rail carrying VDD_APC via one or more power switches. In certain aspects, if a core is in an active mode, the switches associated with the core and its peripheral components are operated to couple the core and its peripheral components to the voltage rail carrying VDD_APC. In certain aspects, if the core is in a low power mode, the switches associated with the core and its peripheral components are operated to decouple the core and its peripheral components from the voltage rail carrying VDD_APC.

Similarly, multiple power switches are used to selectively couple memory (e.g., caches) associated with the cores of a cluster to the voltage rail carrying VDD_MX. For example, each cache of a SoC may include a large number of memory instances, and the power to each memory instance (e.g., and its corresponding memory peripheral component) may be individually controllable. In particular, each memory instance may be selectively coupled to the voltage rail carrying VDD_MX via one or more power switches. Therefore, there may be a large number of power switches associated with the large number of memory instances of each memory (e.g., cache). In certain aspects, if a memory instance is in an active mode (based on the associated core being in the active mode), the switches associated with the memory instance are operated to couple the memory instance to the voltage rail carrying VDD_MX. In certain aspects, if the memory instance is in a low power mode, the switches associated with the memory instance are operated to decouple the memory instance from the voltage rail carrying VDD_MX.

In certain aspects, multiple cores of a cluster and/or multiple memory instances associated with cores may switch operating modes (e.g., from active mode to low power mode, or vice versa). Opening and/or closing (in other words, switching) of the switches that couple the peripheral components and memory instances associated with the cores may be performed serially and at a particular rate to provide in-rush management so that there is no voltage droop on the associated voltage rail. For example, if multiple memory instances were coupled or decoupled from a voltage rail carrying VDD_MX at the same time or in quick succession, there may be droop on the voltage rail. Similarly, if multiple cores and/or peripheral components were coupled or decoupled from a voltage rail carrying VDD_APC at the same time or in quick succession, there may be droop on the voltage rail. Accordingly, in certain aspects, the rate at which power switches are switched to couple/decouple components (e.g., cores, peripheral components, memory instances, etc.) from the discussed voltage rails is controlled to prevent droop. This rate may be quantified as the interval between toggling switches (e.g., turning on/off transistors) in an array of switches, each switch selectively coupling and/or decoupling one component to/from a voltage rail. For example, if an array of switches includes 10 switches, and the rate is 1 switch per 1 ns, then a different switch would be opened or closed each 1 ns, thus requiring 10 ns to toggle all 10 switches. Conventionally, this rate has been set based on a worst case scenario assuming that there are no or minimal other components coupled to the voltage rail, and the rate is constant for all switches. This can lead to long latencies in waking-up cores (e.g., from low power mode to active mode) and in powering down cores (e.g., from active mode to low power mode).

Longer latencies in waking-up cores and powering down cores may adversely affect operation of an application/operating system (OS) idle scheduler of the computing device. For example, an idle scheduler may be configured to determine when to power down cores of the computing device to save on power consumption. If the latency of waking-up cores and powering down cores is longer, the idle scheduler may not power down cores as frequently in order to achieve the desired responsiveness level (e.g., for snoop performance, interrupt service, etc.).

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a computing device. The computing device includes a plurality of computing cores, each configured to operate in any one of a plurality of operating modes. The computing device further includes a first voltage rail and a plurality of components, each associated with one of the computing cores. The computing device further includes a plurality of switches, each switch configured to selectively couple a corresponding one of the plurality of components to the first voltage rail. The computing device further includes a controller configured to determine a current operating mode of each of the plurality of computing cores and switch the plurality of switches at a first selected switching rate based on the determined current operating mode of each of the plurality of computing cores.

In some aspects, the present disclosure provides a method for selectively coupling components associated with computing cores to a voltage rail. The method includes determining a current operating mode of each of a plurality of computing cores, each computing core configured to operate in any one of a plurality of operating modes. The method further includes switching a plurality of switches at a first selected switching rate based on the determined current operating mode of each of the plurality of computing cores, each switch configured to selectively couple a corresponding one of a plurality of components to a first voltage rail, each component associated with one of the computing cores.

In some aspects, the present disclosure provides a computing device. The computing device includes means for determining a current operating mode of each of a plurality of computing cores, each computing core configured to operate in any one of a plurality of operating modes. The method further includes means for switching a plurality of switches at a first selected switching rate based on the determined current operating mode of each of the plurality of computing cores, each switch configured to selectively couple a corresponding one of a plurality of components to a first voltage rail, each component associated with one of the computing cores.

In some aspects, the present disclosure provides a non-transitory computer-readable medium having instructions stored thereon that when executed by circuitry cause the circuitry to perform a method for selectively coupling components associated with computing cores to a voltage rail. The method includes determining a current operating mode of each of a plurality of computing cores, each computing core configured to operate in any one of a plurality of operating modes. The method further includes switching a plurality of switches at a first selected switching rate based on the determined current operating mode of each of the plurality of computing cores, each switch configured to selectively couple a corresponding one of a plurality of components to a first voltage rail, each component associated with one of the computing cores.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Although the teachings of this disclosure are illustrated in terms of integrated circuits (e.g., a SoC) as an example of computing devices, the teachings are applicable in other areas. The teachings disclosed should not be construed to be limited to SoC designs or the illustrated embodiments. The illustrated embodiments are merely vehicles to describe and illustrate examples of the inventive teachings disclosed herein. For example, the techniques described herein may be applicable to any suitable system such as any on-chip or off-chip discreet digital/analog system with one or more shared voltage rails having multiple components powered under the same shared rail(s) wherein each component or "group of components" can independently enter low power mode or exit low power mode with inrush management.

Figure 1:
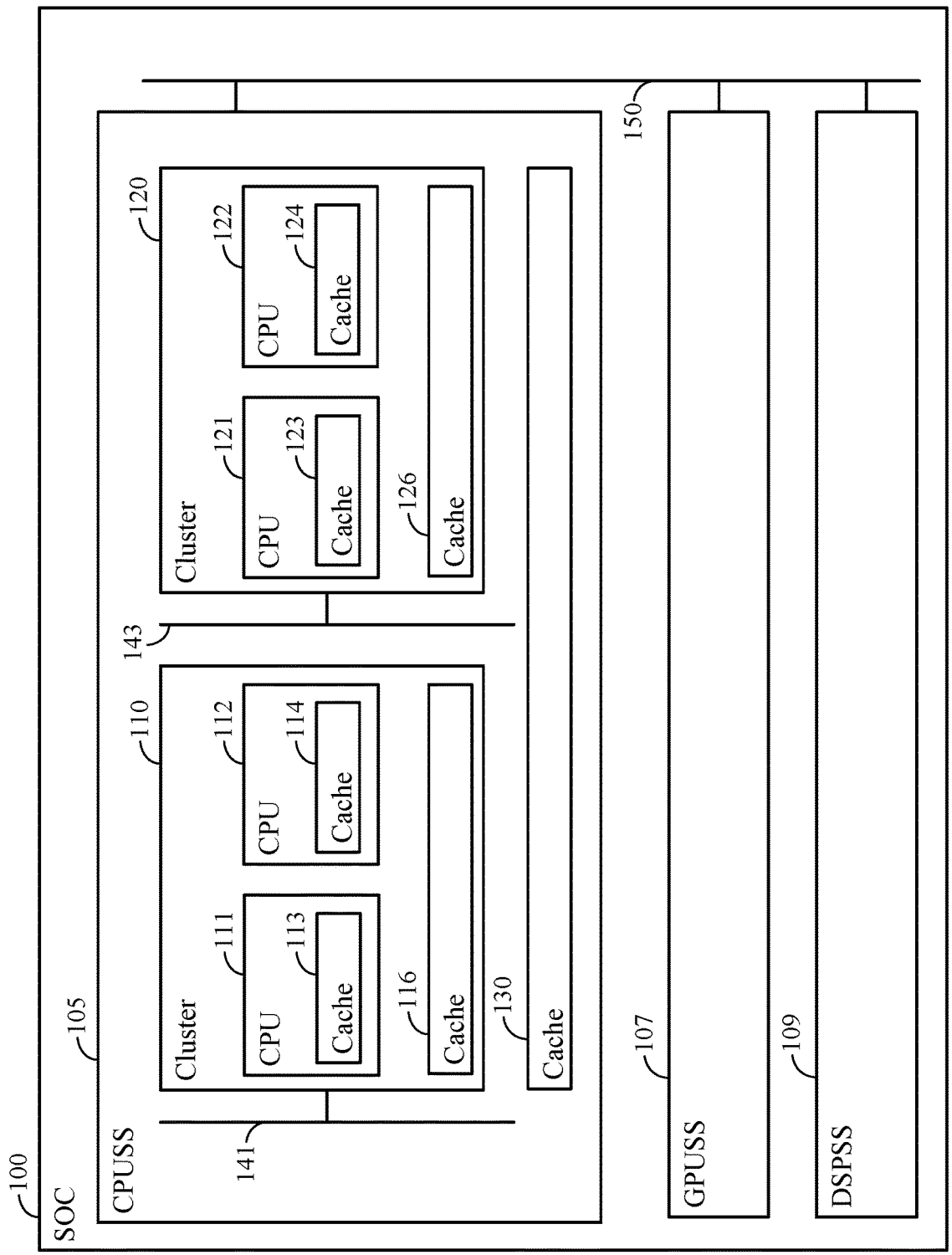
FIG. 1 is a simplified schematic diagram of a computing device, in accordance with certain aspects of the present disclosure.

FIG. 1 is a simplified schematic diagram of an exemplary computing device 100, in accordance with certain aspects of the present disclosure. In particular, computing device 100 is shown as a SoC and is referred to as SoC 100 herein. The SoC 100 may include additional components or fewer components than shown, and further may be interconnected to other chips by one or more chip-to-chip interfaces such as peripheral component interconnect express (PCIe), universal serial bus (USB), serial peripheral interface (SPI), etc.

As shown, the SoC 100 includes a CPU sub-system (CPUSS) 105. The CPUSS 105 includes a plurality of CPU cores 111, 112, 121, and 122. Though CPUSS 105 is shown with a particular number of CPU cores, it should be noted that there may be additional or fewer cores in CPUSS 105. Further, CPU cores 111 and 112 are part of a cluster 110, and CPU cores 121 and 122 are part of a cluster 120. Again, though shown with a particular number of CPU clusters, CPUSS 105 may include additional or fewer clusters. Further, each cluster may include the same or a different number of CPU cores. The CPU cores 111, 112, 121, and 122 may be of the same type, or may be of different types (e.g., ARM design, non-ARM design, etc.). Further, the CPU cores of a given cluster (e.g., CPU cluster 110 or 120) may be of the same type, or may be of different types (e.g., in-cluster big.LITTLE design, cluster based big.LITTLE design, etc.). A big.LITTLE design may refer to a computing architecture that includes low power, slower processor cores (e.g., LITTLE) that provide battery-savings along with high power, faster processor cores (e.g., big) that provide better processing performance.

Further, the CPUSS 105 may include CPU resources, such as one or more volatile memories (e.g., caches) used by CPU cores for memory storage. For example, CPUSS 105 includes caches 113, 114, 116, 123, 124, 126, and 130. Caches 113, 114, 123, and 124 may be CPU core specific (e.g., L1 caches), meaning each of caches 113, 114, 123, and 124 is associated with and used by one of CPU cores 111, 112, 121, and 122. As shown, caches 113, 114, 123, and 124 are associated with CPU cores 111, 112, 121, and 122, respectively. Caches 116 and 126 may be CPU cluster specific (e.g., L2 caches), meaning each of caches 116 and 126 is associated with and used by each of the CPU cores of one of CPU clusters 110 and 120. As shown, caches 116 and 126 are associated with CPU clusters 110 and 120 respectively. Accordingly, cache 116 may be shared by CPU cores 111 and 112, and cache 126 may be shared by CPU cores 121 and 122. Cache 130 may be CPUSS specific (e.g., L3 cache), meaning cache 130 is shared by the CPU cores 111, 112, 121, and 122 of CPUSS 105. It should be noted that the CPUSS 105 may include additional or different CPU resources than those shown.

The SoC 100 further may include one or more additional CPUSS, one or more GPUSS such as GPUSS 107, and one or more DSPSS such as DSPSS 109. In certain aspects, each of GPUSS 107 and DSPSS 109 may have its own clusters of computing cores and volatile memory, similar to CPUSS 105. The internal components of the SoC 100 may be coupled together by a bus (not shown). It should be noted that though certain aspects are described with respect to a CPUSS and CPU cores as computing cores, techniques and aspects herein can also be used for other subsystem types (e.g., GPUSS, DSPSS, etc.) with other computing core types (e.g., GPU, DSP, etc.).

Each of clusters 110 and 120 of CPUSS 105 is supplied power by a separate voltage rail 141 and 143, respectively. Though not shown, each cluster of GPUSS 107 and DSPSS 109 may also be supplied power by a separate voltage rail. In particular, voltage rails 141 and 143 are configured to supply a voltage (referred to as VDD_PC) to clusters 110 and 120, respectively, such as to power the computing cores and peripheral components (not shown) of clusters 110 and 120, respectively. The voltage rail 141 supplies a first voltage VDD_APC_1 to cluster 110, and the voltage rail 143 supplies a second voltage VDD_APC_2 to cluster 120.

Further, each subsystem CPUSS 105, GPUSS 107, and DSPSS 109 (e.g., including each of their clusters) of SoC 100 is supplied power by a shared voltage rail 150. In particular, voltage rail 150 is configured to supply a voltage (referred to as VDD_X) to each of CPUSS 105, GPUSS 107, and DSPSS 109, such as to power the caches of each of CPUSS 105, GPUSS 107, and DSPSS 109.

As discussed, each of clusters 110 and 120 may be configured to run in different active operating modes (e.g., nominal mode, turbo mode, etc.) where the computing cores of the cluster run at different frequencies. For example, the cluster 110 may run in a nominal mode where the CPU cores 111 and 112 run at a first frequency, and may run in a turbo mode where the CPU cores 111 and 112 run at a second frequency that is higher than the first frequency.

Individual computing cores of each cluster may also be capable of running in either an active mode or one or more low power modes, such as a power collapse mode, retention mode, etc. For example, each of CPU cores 111 and 112 may run in an active mode (e.g., turbo mode or nominal mode) corresponding to the active operating mode of cluster 110, a retention mode, or a power collapse mode. In the retention mode, a computing core may be clock gated and the volatile memory associated with the computing core may be retained so as to keep the current values stored in the volatile memory without changing the values. In the power collapse mode, the volatile memory may be flushed (e.g., to a non-volatile storage). In retention/power collapse modes, a computing core may be powered by a different rail supplying a lower voltage (e.g., a retention voltage lower than VDD_MX and VDD_APC) (not shown), or not be powered.

In certain aspects, SoC 100 includes switching circuitry comprising one or more switches (e.g., also referred to as power switches), such as transistors, that allow components (e.g., cores, peripheral components, memory instances, etc.) to be selectively either coupled to or decoupled from a voltage rail. For example, each component may be connected to a voltage rail via a switching circuitry comprising one or more power switches.

Figure 2:
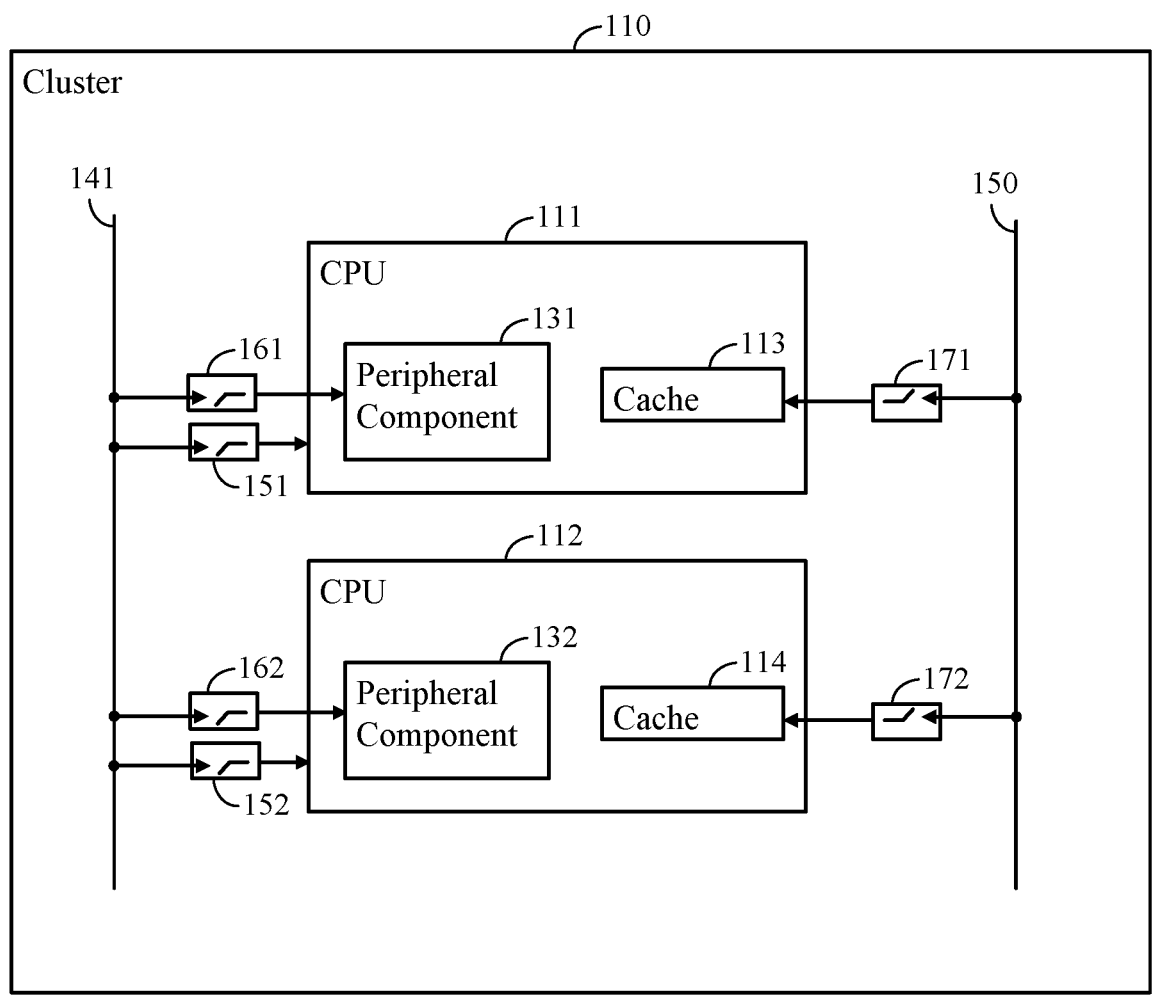
FIG. 2 is a simplified schematic diagram of components of a cluster of the computing device of FIG. 1 coupled to power rails via switching circuitry, in accordance with certain aspects of the present disclosure.

FIG. 2 is a simplified schematic diagram of components of cluster 110 coupled to power rails via switching circuitry, according to certain aspects. As shown, each of CPU 111 and CPU 112 is coupled to voltage rail 141 by switching circuitry 151 and 152, respectively. Further, each of peripheral components 131 and 132 (e.g., associated with caches 113 and 114, respectively) is coupled to voltage rail 141 by switching circuitry 161 and 162, respectively. Each of caches 113 and 114 is coupled to voltage rail 150 by switching circuitry 171 and 172, respectively.

In certain aspects, caches 113 and 114 may be examples of individually power collapsible memories that each may be further divided into individually power collapsible portions (e.g., memory instances), such as memory instances (MIs) 1-N. Each of the MIs 1-N may be coupled to voltage rail 150 by separate one or more switches (not shown) of switching circuitry 171 and/or 172. Similarly, peripheral components 131 and 132 may each include a plurality of peripheral sub-components (PSCs) 1-N, each associated with a corresponding MI 1-N, respectively. In some aspects, there may not be a one-to-one correspondence between memory instances and peripheral sub-components. For example, there may be more than one memory instance per peripheral sub-component, more than one peripheral sub-component per memory instance, or peripheral sub-components that are not associated with a particular memory instance. Each of the PSCs 1-N may be coupled to voltage rail 141 by separate one or more switches (not shown) of switching circuitry 161 and/or 162.

As discussed, when a core switches operating modes, components associated with the core may be selectively coupled/decoupled to/from a voltage rail. For example, when CPU 111 is switched between operating modes, switching circuitry 151 and 161 selectively couples/decouples CPU 111 and peripheral component 131 to/from voltage rail 141. Further, switching circuitry 171 selectively couples/decouples cache 113 to/from voltage rail 150.

In another example, when CPU 112 is switched between operating modes, switching circuitry 152 and 162 selectively couples/decouples CPU 112 and peripheral component 132 to/from voltage rail 141. Further, switching circuitry 172 selectively couples/decouples cache 114 to/from voltage rail 150.

It should be noted that though in certain examples provided, all components associated with a particular core are selectively coupled or decoupled from a voltage rail based on an operating mode of the core, this need not always be the case. For example, different low power operating modes may be used where only a portion of the components associated with a particular core are selectively decoupled from a voltage rail, while others remain coupled. This may be taken into account when determining a switching rate based on components coupled to a voltage rail as further discussed herein.

Conventionally, the rate at which switching circuitry is switched (e.g., the rate at which individual switches of the switching circuitry each associated with a different individual component are switched) to couple/decouple the components is set based on a worst case scenario to prevent droop on the voltage rail. For example, the rate at which switching circuitry associated with CPU 111 is switched is based on the assumption that there are no other components (e.g., components associated with other CPUs of cluster 110) coupled to voltage rails 141 and 150.

However, as the number of components coupled to the voltage rail increases, the capacitance on the voltage rail increases. In particular, the upstream capacitance on the voltage rail increases by an amount directly proportional to the active area of active components (e.g., peripheral components, peripheral sub-components, memory instances, etc.) that are actively powered by the voltage rail. With a higher capacitance, the rate at which switches can be switched to couple/decouple the components can be increased without having droop on the voltage rail. For example, the rate at which switching circuitry associated with CPU 111 can be switched without droop when CPU 112 is in an active mode and components associated with CPU 112 are coupled to voltage rails 141 and 150 is higher than the rate at which switching circuitry associated with CPU 111 can be switched without droop when CPU 112 is in a low power mode and components associated with CPU 112 are not coupled to voltage rails 141 and 150.

Accordingly, in certain aspects, a rate at which components are selectively coupled to a voltage rail is based on the number of other components presently actively coupled to the voltage rail. Further, the number of other components presently coupled to the voltage rail may be proportional to the number of cores that are in an active mode, as discussed. Accordingly, in certain aspects, a rate at which components (e.g., of a cluster) are selectively coupled to a voltage rail is based on the number of cores (e.g., of the cluster) in an active mode. By adjusting the switching rate based on the active core count, the latency for waking-up/powering down cores can be reduced. Such reduced latency for waking-up/powering down cores may result in better power-on-reset boot-up latency, better user experience/responsiveness of the SoC 100, and faster interrupt/snoop responses. Accordingly, an idle scheduler of the SoC 100 may power down cores more frequently while maintaining the desired responsiveness level, thereby reducing power consumption leading to more days of usage for the SoC 100 on battery power.

For example, multiple cores CPU 111 and CPU 112 of cluster 110 may switch operating modes at a time (e.g., to low power mode or active mode). As discussed, the opening and/or closing of the switches that couple components associated with the cores may be performed serially (e.g., one at a time in any order) at a rate as discussed herein. In the example where the cores CPU 111 and CPU 112 are switched from a low power mode to an active mode, initially, no (or few) components may be coupled to voltage rail 141 and/or voltage rail 150 (e.g., switches 151-173 are open).

Accordingly, as the first core, in one example CPU 112, is switched from the low power mode to the active mode, the switches of switching circuitry 152 and 162 may be switched (e.g., closed) at a first rate for voltage rail 141 to couple components associated with the CPU 112 to the voltage rail 141 based on no or few other components presently being coupled to the voltage rail 141. Similarly, as CPU 112 is switched from the low power mode to the active mode, the switches of switching circuitry 172 may be switched at a first rate for voltage rail 150 to couple components associated with the CPU 112 to the voltage rail 150 based on no or few other components being presently coupled to the voltage rail 150. The first rate for voltage rail 141 and the first rate for voltage rail 150 may the same or different than one another. Further, the opening and/or closing of switches for coupling components to voltage rail 141 may be performed in parallel or in series with the opening and/or closing of switches for coupling components to voltage rail 150, as the in-rush management of separate voltage rails can be performed independently.

As the second core, in this example CPU 111, is switched from the low power mode to the active mode, the switches of switching circuitry 151 and 161 may be switched at a second rate for voltage rail 141 to couple components associated with the CPU 111 to the voltage rail 141 based on components associated with CPU 112 being presently coupled to the voltage rail 141. The second rate for voltage rail 141 is higher/faster than the first rate for voltage rail 141. Similarly, as CPU 111 is switched from the low power mode to the active mode, the switches of switching circuitry 171 may be switched at a second rate for voltage rail 150 to couple components associated with the CPU 111 to the voltage rail 150 based on components associated with CPU 112 being presently coupled to the voltage rail 150. The second rate for voltage rail 150 is higher/faster than the first rate for voltage rail 150. Though not shown, if there were additional cores of cluster 110 that switched form the lower power mode to the active mode, the process continues with the switching rate increasing for the subsequent cores.

Similarly, in the example where cores of a cluster are switched from an active mode to a low power mode, initially, many components may be presently coupled to a voltage rail. Accordingly, as the first core is switched from the active mode to the low power mode, the switches may be switched (e.g., opened) at a first rate to decouple components associated with the first core from the voltage rail based on components associated with each of the cores being presently coupled to the voltage rail. As the second core is switched from the active mode to the low power mode, the switches may be switched at a second rate to decouple components associated with the second core from the voltage rail based on fewer components (i.e., those associated with the first core) being presently coupled to the voltage rail. The second rate here would be lower/slower than the first rate. The process continues with the switching rate decreasing for subsequent cores.

In certain aspects, instead of all the switching circuitry associated with a particular core and voltage rail being opened and/or closed at the same rate, different switching circuitry associated with a particular core and voltage rail may be opened and/or closed at different rates (e.g., based on the number of switches in the switching circuitry, based on the order in which the switching circuitry are opened and/or closed, etc.). In the example above, each of switching circuitry 152 and 162 are switched at a same rate associated with voltage rail 141. Instead, in certain aspects, each of switching circuitry 152 and 162 are switched at different rates. For example, as discussed, each of switching circuitry 152 and 162 may be opened and/or closed serially, in an order. If the switches of switching circuitry 152 are closed prior to switching circuitry 162, there are a different number of components coupled to voltage rail 141 during the opening and/or closing of the switches of switching circuitry 152 versus the opening and/or closing of the switches of switching circuitry 162. In particular, if the switches of switching circuitry 152 are closed prior to closing the switches of switching circuitry 162, any components associated switching circuitry 152 are presently coupled to voltage rail 141 when closing the switches of switching circuitry 162, but not when closing the switches of switching circuitry 152. Therefore, switches of switching circuitry 162 may be closed at a faster rate than the switches of switching circuitry 152. Similarly, the rates for different switching circuitry associated with a particular core and associated with the same voltage rail may be opened at different rates.

In certain aspects, a controller (not shown) may be configured to control the opening and closing of switches of switching circuitry 151-172 as discussed. In certain aspects, the controller may be configured with different switching rates associated (e.g., as a table, algorithm, mapping, equation, function, etc.) with different number of cores in an active mode of a cluster. The controller may utilize the current number of cores in an active mode of a cluster to determine the switching rate to control the opening and closing of switches of switching circuitry of a core that is switching operating modes.

Figure 3:
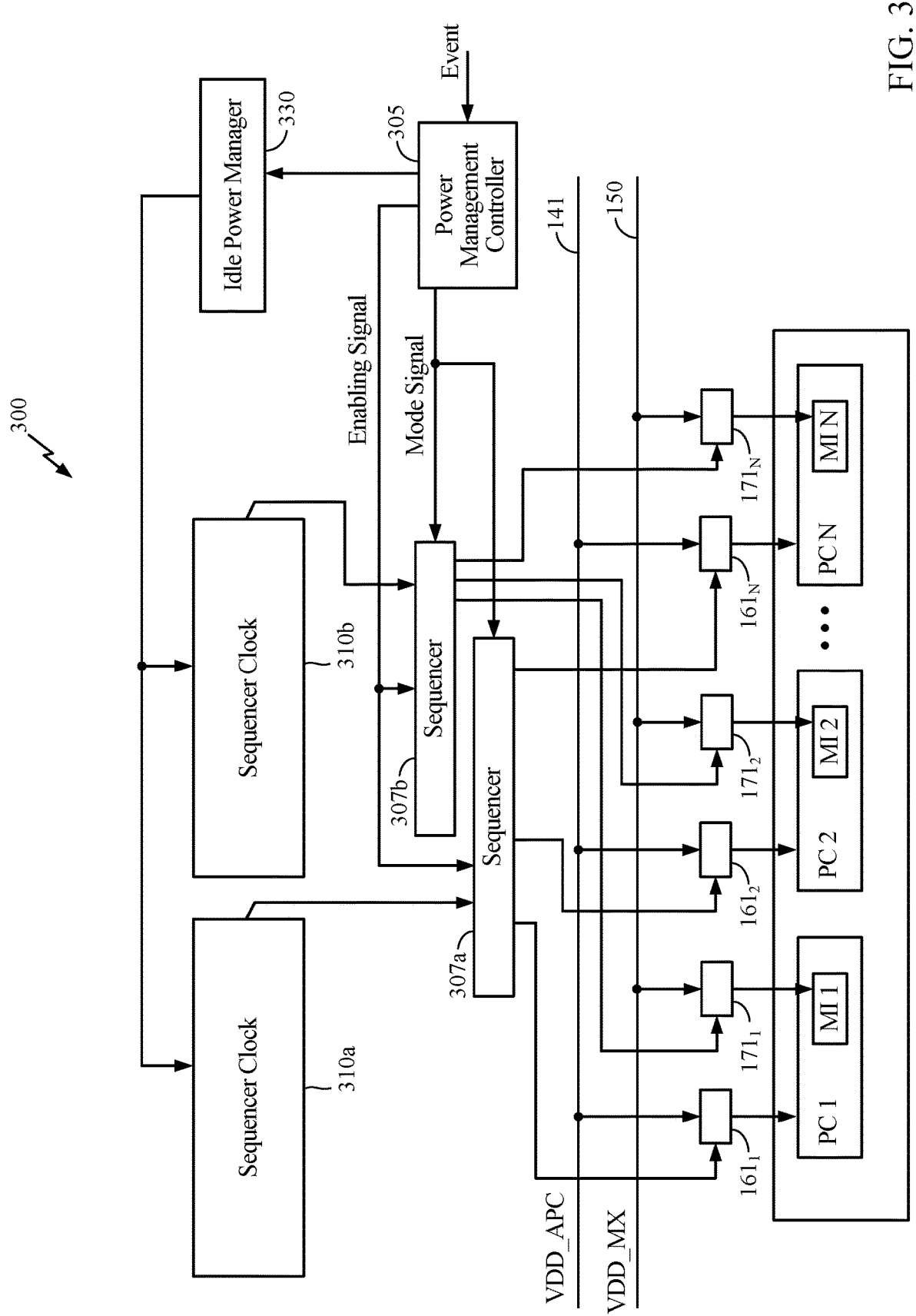
FIG. 3 is a simplified schematic diagram of a switching circuitry controller, in accordance with certain aspects of the present disclosure.

FIG. 3 is a simplified schematic diagram of a switching circuitry controller 300 that may be included in SoC 100, in accordance with certain aspects of the present disclosure. In particular, controller 300 is shown controlling switches of switching circuitry 161 and 171 for selectively coupling/decoupling peripheral component 131 and cache 113 to/from voltage rails 141 and 150, respectively, described with respect to FIGS. 1 and 2. In particular, as shown in FIG. 3, peripheral component 131 is subdivided into individually power collapsible peripheral sub-components PSC 1-N. Further, cache 113 is subdivided into individually power collapsible memory instances MI 1-N. Switching circuitry 161, as shown, includes a plurality of switches $161_1$-$161_N$, each for selectively coupling/decoupling one of PSC 1-N, respectively, to/from voltage rail 141. Switching circuitry 171, as shown, includes a plurality of switches $171_1$-$171_N$, each for selectively coupling/decoupling one of MI 1-N, respectively, to/from voltage rail 150.

Figure 4:
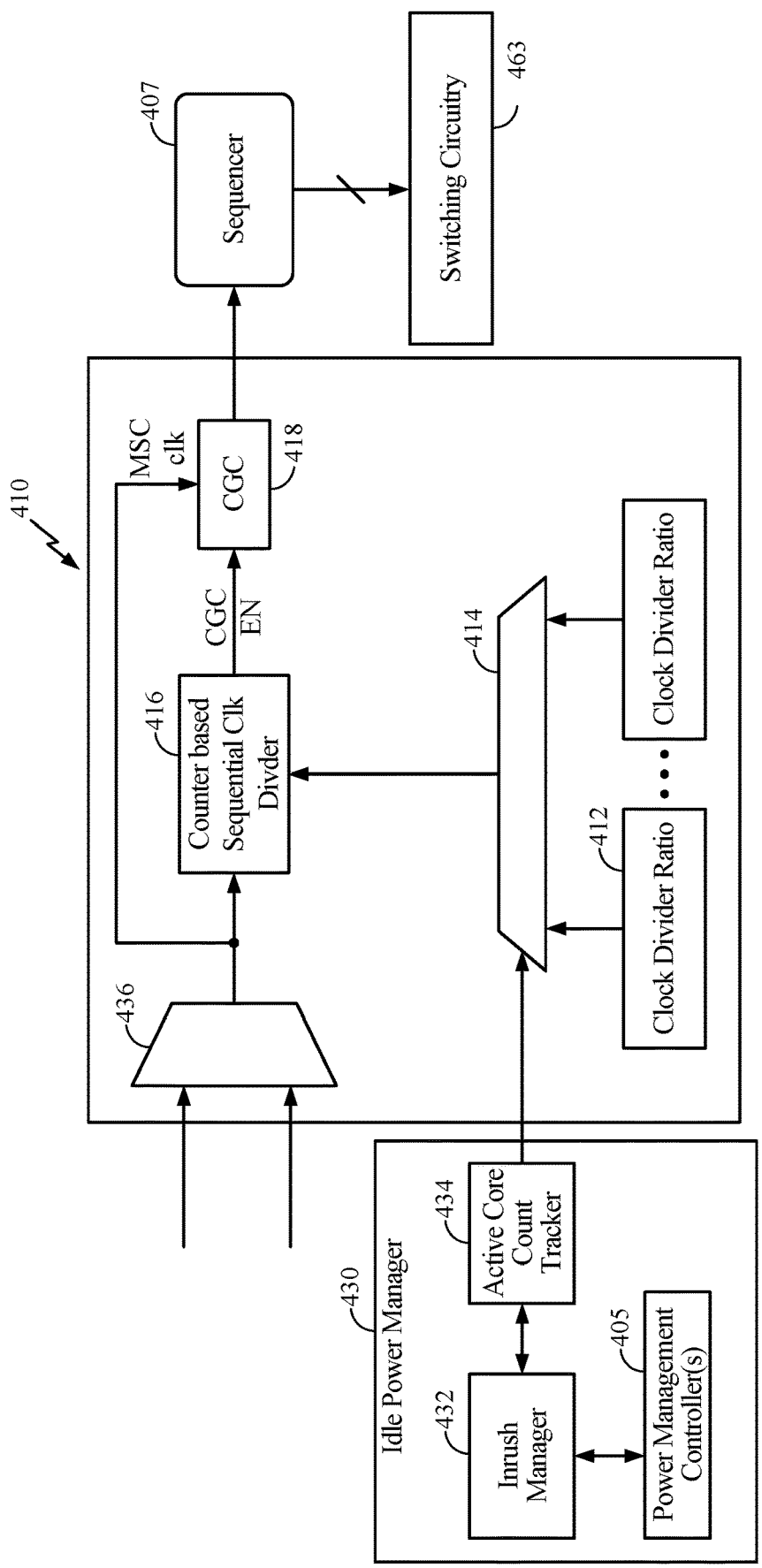
FIG. 4 is a simplified schematic diagram of details of an idle power manager and sequencer clock, in accordance with certain aspects of the present disclosure.

As shown, controller 300 includes an idle power manager (IPM) 330. Controller 300 further includes a power management controller 305. In certain aspects, though not shown, controller 300 includes a separate power management controller 305 for each core (e.g., CPU 111, CPU 112, CPU 121, and CPU 122) as well as a separate power management controller 305 for each cluster (e.g., cluster 110 and cluster 120) of each subsystem (e.g., CPUSS 105) of SoC 100. Accordingly, each power management controller 305 is configured to manage the power of a different power domain (e.g., corresponding to a particular core or cluster). In certain aspects, power management controller 305 is separate from IPM 330 as shown in FIG. 3, and may be communicatively coupled to IPM 330. In certain aspects, an IPM includes power management controllers, as shown in FIG. 4.

IPM 330 is further communicatively coupled to one or more sequencer clocks 310, shown as sequencer clocks 310a and 310b in FIG. 3. Each sequencer clock 310 is further communicatively coupled to a sequencer 307 (e.g., a shift register), shown as sequencers 307a and 307b in FIG. 3. In certain aspects, SoC 100 includes a separate sequencer clock 310 and sequencer 307 for each separate voltage rail of SoC 100. In particular, each sequencer clock 310 and sequencer 307 may be associated with and coupled to multiple switches of a switching circuitry, each switch selectively coupling a component to a particular voltage rail. Therefore, each sequencer clock 310 and sequencer 307 is also associated with a certain switching circuitry/set of switches/components. For example, as shown in FIG. 3, a sequencer clock 310a is associated with a sequencer 307a in that the sequencer clock 310a is communicatively coupled to the sequencer 307a. Further, sequencer 307a is communicatively coupled to switches $161_1$-$161_N$ of switching circuitry 161, which is further coupled to voltage rail 141. Accordingly, both sequencer 307a and sequencer clock 310a are associated with voltage rail 141 based on mutual connections to voltage rail 141. Similarly, sequencer clock 310b is associated with a sequencer 307b in that the sequencer clock 310b is communicatively coupled to the sequencer 307b. Further, sequencer 307b is communicatively coupled to switches $171_1$-$171_N$ of switching circuitry 171, which is further coupled to voltage rail 150. Accordingly, both sequencer 307b and sequencer clock 310b are associated with voltage rail 150 based on mutual connections to voltage rail 150.

As shown, the SoC 100 may include separate sequencer clocks 310 and sequencers 307 for different voltage rails. Further, if there are multiple independently collapsible power domains for a single voltage rail, though not shown, SoC 100 may include multiple sequencer clocks 310 and sequencers 307 for a single voltage rail of SoC 100. For example, the switching circuitry of a voltage rail may be grouped into different subsets (e.g., associated with different caches, different types of components, etc.) each controlled by a separate sequencer clock 310 and sequencer 307.

Each sequencer 307 is configured to control the opening and/or closing of switches serially (e.g., one at a time in any order) to couple/decouple components to/from a voltage rail (e.g., associated with a cluster) based on a clock signal received from its corresponding sequencer clock 310 and an indication of a change in operating mode (e.g., of a core) from a power management controller 305. The sequencer clock 310 is further configured to generate the clock signal based on a number of active cores associated with the voltage rail/cluster, as further described herein. For example, the sequencer clock 310 may be configured to generate a clock signal with an optimized frequency for an optimized rate of entry or exit of a low power mode for a power domain, such as based on a clock divider ratio as further discussed herein.

It should be noted that though certain embodiments are described with respect to a L1 cache, similar techniques can be applied to other caches, such as an L2 or L3 cache shared by multiple cores and/or clusters of a subsystem.

For example, a power management controller 305 associated with a voltage rail/cluster, in this example cluster 110, is configured to receive an event (e.g., indication to enter low power mode or interrupt to exit a low power mode) indicating that one or more cores associated with the cluster 110, in this example one or more of CPU 111 and 112, are to change an operating mode. Based on the event, power management controller 305 is further configured to send a mode signal to sequencers 307a and 307b indicating whether the event indicates to change to a low power mode or an active mode.

After sending the mode signal to sequencers 307a and 307b, power management controller 305 is configured to generate and send an enabling signal to each of sequencers 307a and 307b that enables each of sequencers 307a and 307b to open and/or close certain switches of switching circuitry 161 and 171 coupled to sequencers 307a and 307b. For example, the power management controller 305 may determine that all or only a portion of PSC 1-N and MI 1-N should be coupled/decoupled to/from voltage rail 141 and 150, respectively, based on the change in operating mode of one or more of CPU 111 and 112, as previously discussed. Accordingly, power management controller 305 may send an enabling signal that enables sequencers 307a and 307b to open and/or close only the switches $161_1$-$161_N$ and $171_1$-$171_N$ of switching circuitry 161 and 171 corresponding to the determined all or only a portion of PSC 1-N and MI 1-N.

The sequencers 307a and 307b, based on receiving the mode signal and the enabling signal are configured to couple/decouple one or more of PSC 1-N and MI 1-N to/from voltage rail 141 and 150, respectively, by closing/opening the enabled switches $161_1$-$161_N$ and $171_1$-$171_N$ of switching circuitry 161 and 171 serially one at a time. For example, if the mode signal indicates to enter a low power mode, sequencers 307a and 307b open enabled switches $161_1$-$161_N$ and $171_1$-$171_N$ of switching circuitry 161 and 171. In another example, if the mode signal indicates to exit a low power mode (e.g., enter an active mode), sequencers 307a and 307b close enabled switches $161_1$-$161_N$ and $171_1$-$171_N$ of switching circuitry 161 and 171. The switches $161_1$-$161_N$ and $171_1$-$171_N$ of switching circuitry 161 and 171 are opened and/or closed serially one at a time. For example, switch $161_1$ associated with PSC 1 is opened and/or closed, then switch $161_2$ associated with PSC 2 is opened and/or closed, etc. The rate at which the switches of a switching circuitry is opened and/or closed (e.g., the rate from one switch associated with one component (e.g., MI, PSC, etc.) to the next switch associated with the next component) may be based on a frequency of a clock signal received from a corresponding sequencer clock 310, which is based on an active core count, as further discussed herein. For example, the IPM 330 may determine an active core count based on information received from power management controller 305 and further provide such information to sequencer clocks 310a and 310b. Sequencer clocks 310a and 310b may then each generate a clock signal based on the active core count, as further discussed herein.

FIG. 4 is a simplified schematic diagram of details of an IPM and sequencer clock that may be included in SoC 100, in accordance with certain aspects of the present disclosure. In particular, FIG. 4 illustrates an IPM 430, which may be an example of IPM 330 of FIG. 3. FIG. 4 further illustrates a sequencer clock 410, which may be an example of a sequencer clock 310 of FIG. 3. FIG. 4 also illustrates a sequencer 407 (e.g., corresponding to sequencer 307 of FIG. 3) coupled to switching circuitry 463 (e.g., corresponding to switching circuitry 161 and/or 171).

IPM 430 includes one or more power management controllers 405 (e.g., corresponding to power management controller 305 of FIG. 3). Power management controllers 405 are communicatively coupled to an inrush manager 432 of IPM 430. Each power management controller 405 may provide an indication to inrush manager 432 of whether its associated power domain is changing an operating mode. For example, a power management controller 405 associated with CPU 111 is configured to determine if CPU 111 is to change operating modes and provide an indication of the change in operating mode (e.g., an indication to enter a low power mode, such as an indication of entry into a low power mode from an active mode; or an indication to enter an active mode, such as an indication of exit of a low power mode to an active mode).

Inrush manager 432 is configured to allow only one core (e.g., of a cluster, of a subsystem, of SoC 100, etc.) to switch operating modes at a time, such as to avoid droop on a voltage rail, as discussed. For example, if multiple cores try to switch an operating mode at one time, inrush manager 432 is configured to select only one of the multiple cores at a time to switch operating modes, in series.

In particular, as part of the process of individual power management controllers 405 providing an indication to inrush manager 432, individual power management controllers 405 may try to acquire a lock with inrush manager 432. For example, a power management controller 405 may try to acquire a lock using a 4-way handshake process (e.g., similar to a semaphore based lock process) by first asserting a lock grant request (e.g., inrush manager (IM) grant request) with inrush manager 432. The inrush manager 432 may receive such asserted lock grant requests from multiple power management controllers 405 seeking to change an operating mode of its power domain at a time. The inrush manager 432 may grant a lock to only one of the multiple power management controllers 405 at a time by asserting a lock grant acknowledgement (e.g., IM grant ACK) for only one of the multiple power management controllers 405 at a time. Once a power management controller 405 determines it has an asserted lock grant acknowledgement, it completes the operation of changing an operating mode of its power domain. The power management controller 405 then de-asserts its lock grant request, and the inrush manager 432 acknowledges the de-assertion by de-asserting the lock grant acknowledgement for the power management controller 405.

Active core count tracker 434 of IPM 430 is communicatively coupled to inrush manager 432. Inrush manager 432 is configured to provide information to active core count tracker 434 corresponding to the indication of the change in operating mode for each core. In particular, in some embodiments, when inrush manager 432 de-asserts the lock grant acknowledgement, it indicates to active core count tracker 434 the change in the operating mode of the power domain for one of the power management controllers 405. In some embodiments, active core count tracker 434 is configured to directly check the buses/lines carrying the handshake process messages between power management controllers 405 and inrush manager 432 to determine if a power domain has changed operating modes. For example, for each power management controller 405, there may be different buses/lines coupled to inrush manager 432. Whenever active core count tracker 434 detects a request and acknowledgement for a given power management controller 405, the active core count tracker 434 increments or decrements a number of active cores. In particular, a first detection of a request and acknowledgement may be considered an increment/decrement when the power management controller 405 initially powers up/down a power domain to an active mode/low power mode. Subsequent detections of a request and acknowledgement would toggle between increment and decrement as the given power domain would switch between active mode and low power mode. In some other embodiments, the active core count tracker 434 may be configured to interface directly with the power management controllers 405 to check on the status of the operating mode of the associated power domains.

Based on this information, active core count tracker 434 is configured to increment or decrement a number of active cores. In certain aspects, active core count tracker 434 is configured to separately track a number of active cores associated with each voltage rail (e.g., for each VDD_APC, VDD_MX, etc.). Accordingly, in certain aspects, active core count tracker 434 keeps track of the number of cores that are in an active mode for each of one or more clusters, since each cluster is associated with a different voltage rail carrying a different VDD_APC.

IPM 430 is further communicatively coupled to one or more sequencer clocks 410. In particular, active core count tracker 434 of IPM 430 is communicatively coupled to sequencer clock 410.

Sequencer clock 410 includes a multiplexer 414. Multiplexer 414 is coupled to active core count tracker 434 of IPM 430. In particular, active core count tracker 434 is configured to provide a control signal to multiplexer 414 to select one of a plurality of inputs of multiplexer 414 to couple to an output of multiplexer 414 at a time.

Multiplexer 414 includes a plurality of inputs coupled to a plurality of registers 412 of sequencer clock 410, each register 412 including a different clock divider ratio value. Each register 412 includes a different clock divider ratio value corresponding to a different number of cores in an active mode (e.g., of a cluster). In particular, as discussed, the current number of cores in an active mode of a cluster may be used to determine the switching rate to control the opening and closing of switches of switching circuitry of a core that is switching operating modes. Accordingly, the clock divider ratio value of each register 412 may be set so that a clock signal generated by sequencer clock 410 causes a sequencer 407 to operate at an appropriate rate based on the current number of cores in an active mode.

For example, in some embodiments, the clock divider ratio values are determined based on simulations (e.g., power delivery network (PDN) simulations) of a model of the SoC 100. These simulations may give a best switching rate (e.g., based on an upstream capacitance) at which switching circuitry of a core can be operated for different possible cases of number of cores/components in an active mode. In certain embodiments, a resonant frequency of the switching circuitry is not used as a switching rate to avoid under-damped/high oscillations.

The active core count tracker 434 sends a control signal corresponding to the number of cores in an active mode, which causes multiplexer to couple the register 412 associated with the number of cores in an active mode to an output of the multiplexer 414. The output of multiplexer 414 is further coupled to a counter based sequential clock divider 416 of sequencer clock 410.

The sequential clock divider 416 is configured to count a number of clock cycles of a clock signal and generate a clock gating enable signal (CGC EN) at a ratio of the clock cycles according to the clock divider ratio value at the output of multiplexer 414. For example, if the ratio is 1:N, sequential clock divider 416 generates the clock gating enable signal for 1 clock cycle of every N clock cycles.

The sequential clock divider 416 receives the clock signal from a multiplexer 436, which may selectively supply one of a plurality of clock signals at different frequencies so as to provide flexibility to run the sequencer clock 410 at different rates. In some aspects, there is no multiplexer 436 and only a single clock signal is provided to sequential clock divider 416.

The sequencer clock 410 further includes a clock gating component (CGC) 418 that receives the clock signal from multiplexer 436 and the clock gating enable signal from sequential clock divider 416. Clock gating component 418 is configured to generate a pulse from the clock signal from multiplexer 436 when it receives the clock gating enable signal from sequential clock divider 416. Accordingly, clock gating component 418 generates a pulse at a rate based on the selected clock divider ratio value, and therefore based on the number of active cores. The signal generated by the clock gating component 418, therefore, corresponds to the output clock signal of sequencer clock 410, and is output to sequencer 407 for controlling the opening and closing of switching circuitry 463 similar to as discussed with respect to FIG. 3.

Figure 5:
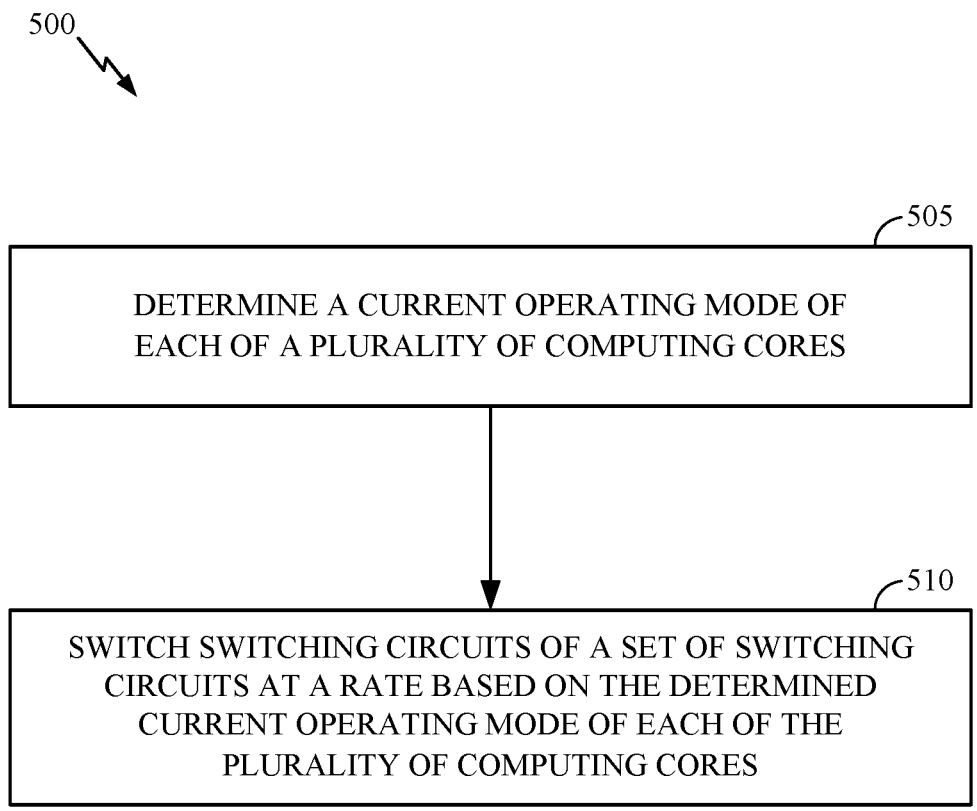
FIG. 5 is a flow chart that illustrates example operations for selectively coupling components associated with computing cores to a voltage rail at a rate based on the number of components actively coupled to the voltage rail, in accordance with certain aspects of the present disclosure.

FIG. 5 is a flow chart that illustrates example operations for selectively coupling components associated with computing cores to a voltage rail at a rate based on the number of components actively coupled to the voltage rail. For example, the operations of FIG. 5 may be performed by one or more controllers of the SoC 100 including controller 300, or another suitable circuit.

At step 505, a controller determines a current operating mode of each of a plurality of computing cores. For example, the controller may determine the operating mode of a plurality of computing cores (e.g., of a cluster) based on one or more signals received indicating which operating mode the computing cores are in.

In certain aspects, each component (e.g., peripheral component, peripheral sub-component, memory instance, etc.) of a plurality of components is associated with at least one of the plurality of computing cores. Further, in certain aspects, each set of switching circuits of a plurality of switching circuits is associated with one of the plurality of computing cores. Each switching circuit is configured to selectively couple one of the plurality of components with a voltage rail.

At step 510, the controller switches the switching circuits of the set of switching circuits at a rate based on the determined current operating mode of each of the plurality of computing cores.

In some configurations, the term(s) 'communicate,' 'communicating;' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disc storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc. Combinations of the above should also be included within the scope of computer-readable media.

What is claimed is:

1. A computing device, comprising:
   a plurality of computing cores, each configured to operate in any one of a plurality of operating modes;
   a first voltage rail;
   a plurality of components, each associated with one of the computing cores;
   a plurality of switches, each switch configured to selectively couple a corresponding one of the plurality of components to the first voltage rail; and
   a controller configured to determine a current operating mode of each of the plurality of computing cores and switch the plurality of switches at a first selected switching rate based on the determined current operating mode of each of the plurality of computing cores.

2. The computing device of claim 1, wherein the first voltage rail is a memory voltage rail shared across a plurality of computing clusters, a first computing cluster comprising the plurality of computing cores.

3. The computing device of claim 1, wherein the first voltage rail is a supply voltage rail dedicated to a first computing cluster of a plurality of computing clusters, the first computing cluster comprising the plurality of computing cores.

4. The computing device of claim 1, further comprising:
   a second plurality of components, each associated with a second one of the computing cores; and
   a second plurality of switches, each of the second plurality of switches configured to selectively couple a corresponding one of the second plurality of components to the first voltage rail, wherein the controller is further configured to switch the second plurality of switches at a second selected switching rate based on a second determined current operating mode of each of the plurality of computing cores, wherein the first selected switching rate is based on the plurality of switches and second plurality of switches not coupling the plurality of components and second plurality of components to the first voltage rail, and wherein the second selected switching rate is based on the plurality of switches coupling the plurality of components to the first voltage rail, wherein the second selected switching rate is higher than the first selected switching rate.

5. The computing device of claim 1, wherein the determined current operating mode of each of the plurality of computing cores is indicative of a number of components coupled to the first voltage rail.

6. The computing device of claim 1, further comprising registers configured to store information correlating each of a plurality of switching rates with a different number of computing cores in an active mode, wherein the controller is further configured to determine the first selected switching rate based on the information and the determined current operating mode of each of the plurality of computing cores.

7. The computing device of claim 1, wherein the controller comprises:
   a sequencer clock configured to generate a modified clock signal at the first selected switching rate based on a clock divider ratio associated with the determined current operating mode of each of the plurality of computing cores and a clock signal; and
   a sequencer configured to control the plurality of switches at the first selected switching rate based on the modified clock signal.

8. The computing device of claim 1, wherein the first selected switching rate is different than a resonant frequency of the plurality of switches.

9. A method for selectively coupling components associated with computing cores to a voltage rail, the method comprising:
   determining a current operating mode of each of a plurality of computing cores, each computing core configured to operate in any one of a plurality of operating modes; and
   switching a plurality of switches at a first selected switching rate based on the determined current operating mode of each of the plurality of computing cores, each switch configured to selectively couple a corresponding one of a plurality of components to a first voltage rail, each component associated with one of the computing cores.

10. The method of claim 9, wherein the first voltage rail is a memory voltage rail shared across a plurality of computing clusters, a first computing cluster comprising the plurality of computing cores.

11. The method of claim 9, wherein the first voltage rail is a supply voltage rail dedicated to a first computing cluster of a plurality of computing clusters, the first computing cluster comprising the plurality of computing cores.

12. The method of claim 9, further comprising:
    determining a second current operating mode of each of a plurality of computing cores; and
    switching a second plurality of switches at a second selected switching rate based on the second determined current operating mode of each of the plurality of computing cores, each of the second plurality of switches configured to selectively couple a corresponding one of a second plurality of components to the first voltage rail, each of the second plurality of components associated with a second one of the computing cores, wherein the first selected switching rate is based on the plurality of switches and second plurality of switches not coupling the plurality of components and second plurality of components to the first voltage rail, and wherein the second selected switching rate is based on the plurality of switches coupling the plurality of components to the first voltage rail, wherein the second selected switching rate is higher than the first selected switching rate.

13. The method of claim 9, wherein the determined current operating mode of each of the plurality of computing cores is indicative of a number of components coupled to the first voltage rail.

14. The method of claim 9, further comprising:
    determining the first selected switching rate based on information correlating each of a plurality of switching rates with a different number of computing cores in an active mode and the determined current operating mode of each of the plurality of computing cores.

15. The method of claim 9, further comprising:
    generating a modified clock signal at the first selected switching rate based on a clock divider ratio associated with the determined current operating mode of each of the plurality of computing cores and a clock signal; and
    controlling the plurality of switches at the first selected switching rate based on the modified clock signal.

16. The method of claim 9, wherein the first selected switching rate is different than a resonant frequency of the plurality of switches.

17. A computing device, comprising:
   means for determining a current operating mode of each of a plurality of computing cores, each computing core configured to operate in any one of a plurality of operating modes; and
   means for switching a plurality of switches at a first selected switching rate based on the determined current operating mode of each of the plurality of computing cores, each switch configured to selectively couple a corresponding one of a plurality of components to a first voltage rail, each component associated with one of the computing cores.

18. The computing device of claim 17, wherein the first voltage rail is a memory voltage rail shared across a plurality of computing clusters, a first computing cluster comprising the plurality of computing cores.

19. The computing device of claim 17, wherein the first voltage rail is a supply voltage rail dedicated to a first computing cluster of a plurality of computing clusters, the first computing cluster comprising the plurality of computing cores.

20. The computing device of claim 17, further comprising:
   means for determining a second current operating mode of each of a plurality of computing cores; and
   means for switching a second plurality of switches at a second selected switching rate based on the second determined current operating mode of each of the plurality of computing cores, each of the second plurality of switches configured to selectively couple a corresponding one of a second plurality of components to the first voltage rail, each of the second plurality of components associated with a second one of the computing cores, wherein the first selected switching rate is based on the plurality of switches and second plurality of switches not coupling the plurality of components and second plurality of components to the first voltage rail, and wherein the second selected switching rate is based on the plurality of switches coupling the plurality of components to the first voltage rail, wherein the second selected switching rate is higher than the first selected switching rate.

21. The computing device of claim 17, wherein the determined current operating mode of each of the plurality of computing cores is indicative of a number of components coupled to the first voltage rail.

22. The computing device of claim 17, further comprising:
   means for determining the first selected switching rate based on information correlating each of a plurality of switching rates with a different number of computing cores in an active mode and the determined current operating mode of each of the plurality of computing cores.

23. The computing device of claim 17, further comprising:
   means for generating a modified clock signal at the first selected switching rate based on a clock divider ratio associated with the determined current operating mode of each of the plurality of computing cores and a clock signal; and
   means for controlling the plurality of switches at the first selected switching rate based on the modified clock signal.

24. The computing device of claim 17, wherein the first selected switching rate is different than a resonant frequency of the plurality of switches.

25. A non-transitory computer-readable medium having instructions stored thereon that when executed by circuitry cause the circuitry to perform a method for selectively coupling components associated with computing cores to a voltage rail, the method comprising:
   determining a current operating mode of each of a plurality of computing cores, each computing core configured to operate in any one of a plurality of operating modes; and
   switching a plurality of switches at a first selected switching rate based on the determined current operating mode of each of the plurality of computing cores, each switch configured to selectively couple a corresponding one of a plurality of components to a first voltage rail, each component associated with one of the computing cores.

26. The non-transitory computer-readable medium of claim 25, wherein the method further comprises:
   determining a second current operating mode of each of a plurality of computing cores; and
   switching a second plurality of switches at a second selected switching rate based on the second determined current operating mode of each of the plurality of computing cores, each of the second plurality of switches configured to selectively couple a corresponding one of a second plurality of components to the first voltage rail, each of the second plurality of components associated with a second one of the computing cores, wherein the first selected switching rate is based on the plurality of switches and second plurality of switches not coupling the plurality of components and second plurality of components to the first voltage rail, and wherein the second selected switching rate is based on the plurality of switches coupling the plurality of components to the first voltage rail, wherein the second selected switching rate is higher than the first selected switching rate.

27. The non-transitory computer-readable medium of claim 25, wherein the determined current operating mode of each of the plurality of computing cores is indicative of a number of components coupled to the first voltage rail.

28. The non-transitory computer-readable medium of claim 25, wherein the method further comprises:
   determining the first selected switching rate based on information correlating each of a plurality of switching rates with a different number of computing cores in an active mode and the determined current operating mode of each of the plurality of computing cores.

29. The non-transitory computer-readable medium of claim 25, wherein the method further comprises:
   generating a modified clock signal at the first selected switching rate based on a clock divider ratio associated with the determined current operating mode of each of the plurality of computing cores and a clock signal; and
   controlling the plurality of switches at the first selected switching rate based on the modified clock signal.

30. The non-transitory computer-readable medium of claim 25, wherein the first selected switching rate is different than a resonant frequency of the plurality of switches.

* * * * *